United States Patent [19]

Hayashida et al.

[11] Patent Number: 5,081,478
[45] Date of Patent: Jan. 14, 1992

[54] ADJUSTABLY MOUNTED CAMERA GRIP

[75] Inventors: Takayuki Hayashida; Hidemi Sasaki, both of Tokyo, Japan

[73] Assignee: Fuji Photo Film Co., Ltd., Kanagawa, Japan

[21] Appl. No.: 651,701

[22] Filed: Feb. 6, 1991

[30] Foreign Application Priority Data

Feb. 13, 1990 [JP] Japan ................. 2-032176
Apr. 6, 1990 [JP] Japan ................. 2-090233

[51] Int. Cl.⁵ .......................................... G03B 29/00
[52] U.S. Cl. ................................ 354/81; 354/82; 354/293; 352/243; 358/229; 248/187
[58] Field of Search ................. 354/81, 82, 293, 294, 354/292, 288; 254/103; 74/498, 496, 491, 383; 352/243; 358/229; 248/434, 435, 187

[56] References Cited

U.S. PATENT DOCUMENTS

| 302,467 | 7/1884 | Chamberlin | 254/103 |
|---|---|---|---|
| 452,991 | 5/1891 | Colburn | 254/103 |
| 797,328 | 8/1905 | Schatz | 254/103 |
| 1,496,208 | 6/1924 | Northrop et al. | 74/383 |
| 3,126,187 | 3/1964 | Mooney | 248/187 |
| 4,097,883 | 6/1978 | Adamski et al. | 354/293 |
| 4,600,284 | 7/1986 | Kondoh et al. | 354/82 |
| 4,984,090 | 1/1991 | Sasaki et al. | 354/293 |

Primary Examiner—W. B. Perkey
Assistant Examiner—Cassandra C. Spyron
Attorney, Agent, or Firm—Sughrue, Mion, Zinn, Macpeak & Seas

[57] ABSTRACT

A camera grip which is removably mounted to the bottom portion of a camera. The camera grip includes a base block removably mounted to the camera bottom portion, an arm block rotatably mounted to the base block by means of a first shaft, a grip block rotatably mounted to the arm block by means of a second shaft spaced apart from the first shaft, and lock means for locking the arm and grip blocks at their predetermined rotational positions respectively. By changing the rotational positions to be locked by means of the lock means, the grip can be thinly or compactly stored in the camera bottom portion as well as the shape of the grip can be changed in such a manner that it can be used as an under grip, a carrying handle and a tripod.

8 Claims, 13 Drawing Sheets

FIG. 20

ADJUSTABLY MOUNTED CAMERA GRIP

BACKGROUND OF THE INVENTION

1. Field of the Invention

The present invention relates to a grip for use with a camera and, in particular, to a camera grip which can be used as an under grip as well as a carrying handle for a camera-integral-VTR(video tape recorder) and also can be stored within the VTR when not in use.

2. Description of the Related Art

In general, a camera-integral-VTR is designed compact and, therefore, the camera-integral-VTR does not include therein a separate carrying handle which is exclusively used to carry the camera-integral-VTR. Also, although it is possible to mount an under grip to the camera-integral-VTR by use of a tripod screw in the bottom portion of the camera, the thus mounted under grip is projected out from the main body of the camera, which is inconvenient for carrying and also gives rise to a problem in storing the same into a camera case. In view of this, it is desirable that an under grip to be applied to the camera-integral-VTR can be stored compactly and has a function to serve as a carrying handle as well.

Also, it is desirable that the under grip, while being mounted to the camera-integral-VTR, can stand stably by itself and can also be used as a simple tripod.

Figure 17:
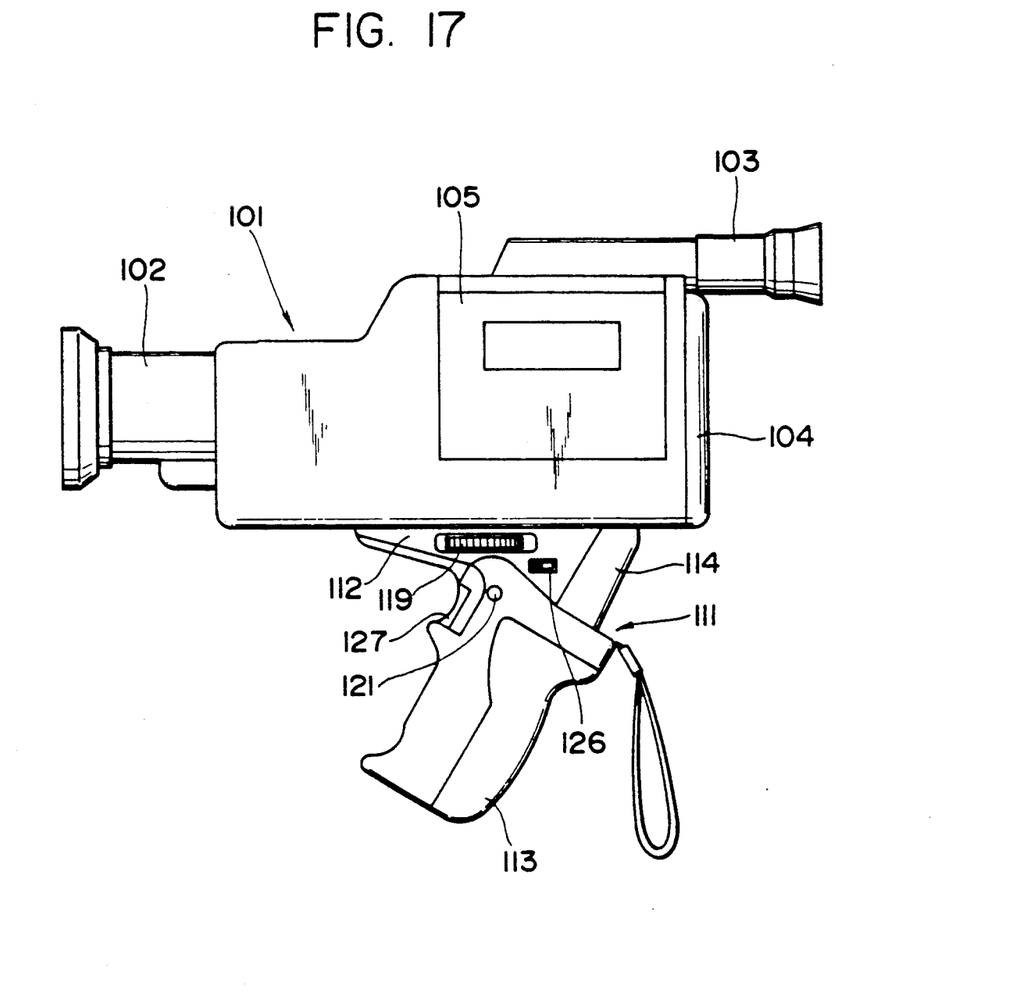
FIG. 17 is a front view of a video camera incorporating terein a camera grip according to the prior art.
Figure 18:
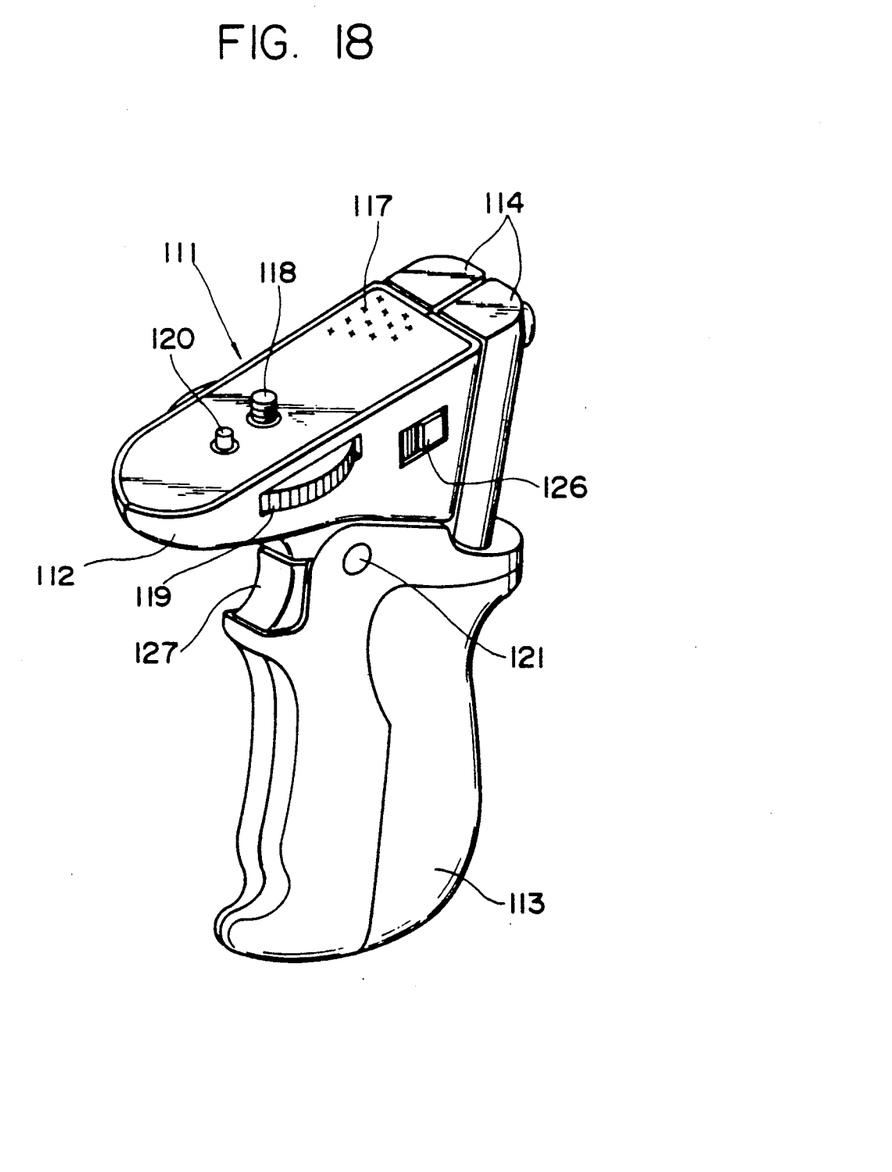
FIG. 18 is a perspective view of the above prior art camera grip.
Figure 19:
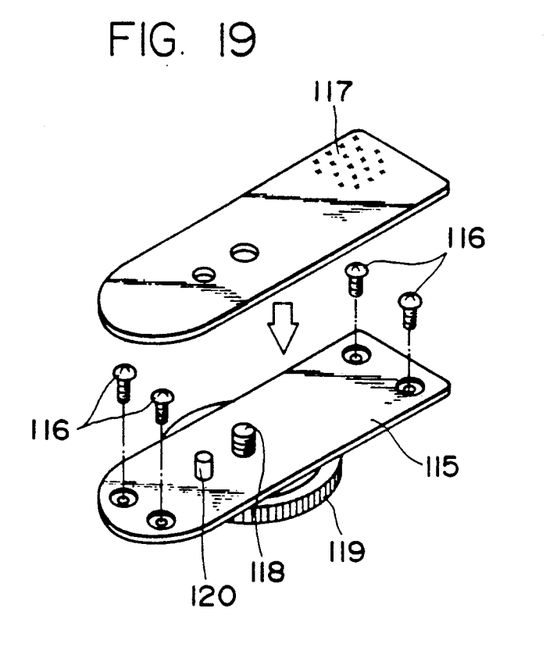
FIG. 19 is an exploded perspective view of a grip base part of the prior art camera grip; and, FIG. 20 is a longitudinal section view of the prior art camera grip.
Figure 20:
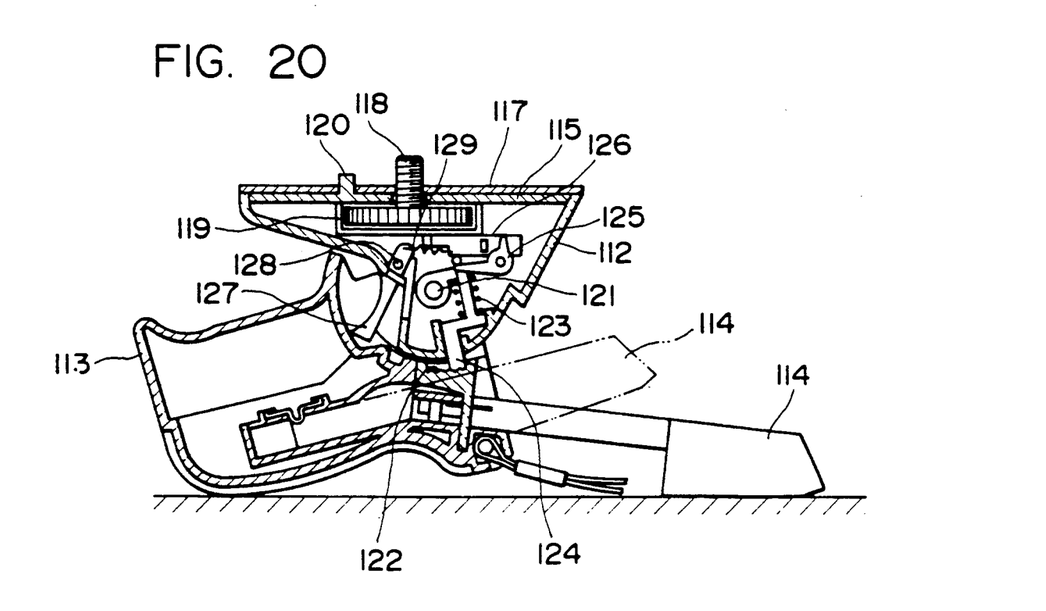

Now, in FIG. 17, there is shown a video camera which includes therein a camera grip according to the prior art, and in FIGS. 18 to 20, there is shown the above camera grip.

As shown in FIG. 17, a video camera 101 includes a lens 102 in the front portion thereof, a view finder 103 and a battery pack 104 in the rear portion thereof, and an insertion portion 105 for insertion of a video tape in the central portion thereof. And, in the lower surface of the video camera 101, there are formed a positioning hole and a screw hole (neither of them are shown) which are used to fix a grip 111 to be described later.

As shown in FIGS. 18 to 20, the grip 111 comprises a base part 112 to be fixed to the video camera 101 and a grip main body 113 to be mounted to the base part 112, and the grip 111 further stores therein a leg portion 114 which is used as a tripod.

The grip base part 112 is formed in a box shape having an opening in the top portion thereof. To the top opening of the grip base part 112 is fixed a base plate 115 by a plurality of fixing screws 116. A sheet 117 formed of vinyl chloride is fixedly secured to the top surface of the base plate 115 by means of a both-side tape. A mount screw 118 is supported rotatably in the top portion of the grip base part 112. The top end of the mount screw 118 is projected out upwardly, while a disc-like operation knob 119 is formed integrally with the bottom portion of the mount screw 118. Also, a positioning projection 120 is formed integrally with the top surface of the base plate 115.

The grip main body 113 is supported rotatably to the grip base part 112 by a support shaft 121 and at the same time can be held at a desired angle by means of an angle lock mechanism. In other words, while a continuously undulated portion 122 is formed integrally with the grip main body 113, in the grip base part 112 there is provided an engagement piece 124 which can be energized by a spring 123 to press against the undulated portion 122. This engagement piece 124 can be operated by a lock lever 126 via a rotary lever 125.

Also, in the grip base part 112 there is provided a recording switch button 127 which is used to set the video camera 101 to its recording mode. The recording switch button 127 is supported rotatably by a support shaft 128 to the grip base part 112, and is also energized in a clockwise direction in FIG. 19 by a spring 129. Further, the recording switch button 127 is connected to the video camera 101 by means of a connecting cord or a remotely controlled transmitter.

Accordingly, to mount the grip 111 to the video camera 101, the positioning projection 120 of the grip 111 is fitted into the positioning hole in the video camera 101, and the mount screw 118 is inserted into the screw hole in the video camera 101. After then, if the operation knob 119 is rotated, then the grip 111 and video camera 101 are threadedly engaged with each other so that the grip 111 is fixed to the video camera 101.

When the video camera 101 is to be operated in the recording mode, an operator may grip the grip 111 and press in the recording switch button 127 with a finger to switch the video camera 101 to the recording mode. If the operator releases the finger, then the recording mode of the video camera 101 can be cancelled and thus the recording can be stopped.

However, the above-mentioned grip 111 cannot be stored compactly or thinly in the camera bottom portion and it cannot be used as a carrying handle.

Also, conventionally, there have been proposed and put into practical use various kinds of other grips such as a grip which can be stored compactly or thinly, a grip usable as a simple tripod, a grip usable as a simple tripod and a carrying handle and the like (see Japanese Utility Model Publication No. 59-2398, Japanese Utility Model Publication No. 50-16490, and Japanese Patent Application Laid-open (Tokkai) No. 56-127895).

However, conventionally, there has never been known such grip of this type which can be stored compactly in the bottom portion of a camera when not in use, is stable when it stands by itself, can be used as a carrying handle, and can be handled properly.

On the other hand, the position for fixing the grip 111 with respect to the video camera 101 is decided in consideration of the holding stability of the grip 111. That is, the screw hole of the video camera 101 is formed so as to be situated at the center of gravity of the video camera 101.

However, in some of the video cameras 101 of this kind, the position of the screw hole may be altered according to the design requirements, the internal mechanisms and the like. In this case, the above-mentioned conventional grip 111 cannot be fixed at a predetermined position in such video camera 101, which provides a problem to be solved. In other words, if the grip 111 cannot be fixed at the predetermined position in the video camera 101, then the operator finds it troublesome to hold the video camera 101 and thus the operationability of the video camera 101 is worsened.

In order to avoid the above problem, conventionally, there has been developed an idea that the mount screw 118 (and the operationable knob 119) is adapted to be movable back and forth or right and left. However, due to the fact that the grip 111 includes therein the leg portion 114 to be used as a tripod, a battery charger, a remotely controlled transmitter and the like, it is very difficult to provide such movable mount screw 118 in the grip 111. Even if such movable mount screw 118 can be provided, the grip 111 must be increased in size, which provides another problem.

Also, new grips can be applied to the respective video cameras having different mount hole forming positions, but this inevitably increases the manufacturing costs of the grips and the grips are expensive accordingly.

SUMMARY OF THE INVENTION

The present invention aims at eliminating the drawbacks found in the above-mentioned prior art camera grips.

Accordingly, it is an object of the invention to provide a camera grip which can be stored compactly, is stable while standing by itself, can be used as a carrying handle, and can be handled smoothly.

It is another object of the invention to provide a camera grip which can be mounted easily even when the position of a hole in a camera for mounting the grip to the camera is altered.

In order to achieve the above objects, according to the invention, there is provided a camera grip which comprises: a base block disposed removably in the bottom portion of a camera; an arm block mounted rotatably to the base block by means of a first shaft; a grip block mounted rotatably to the arm block by means of a second shaft; and, lock means respectively for locking the arm and grip blocks at predetermined positions of rotation.

According to the invention, due to the fact that the above-mentioned base, arm and grip blocks are respectively arranged to be rotatable by means of the first and second shafts, the present grip has an under grip function, can be stored compactly, and can be changed to a shape having a carrying handle function. Also, the grip block need not have an unreasonable shape but can be formed in a desired shape which allows easy holding of the grip.

Also, according to the invention, there is provided a camera grip on the top surface of which a camera is fixedly placed, in which there is provided a mount screw projecting out from the top portion of the grip and threadedly engageable with the lower portion of the camera, there is provided an operation knob used to rotate the mount screw, and the mount screw and operation knob are connected with each other by means of a gear mechanism.

According to the invention, due to the fact that the operation knob is connected through the gear mechanism to the mount screw for fixing the grip, even if the position of a screw hole in the camera is altered, the mount screw can be set according to the altered screw hole positions and thus the grip can be mounted easily at a predetermined position in the camera.

BRIEF DESCRIPTION OF THE DRAWINGS

The exact nature of this invention, as well as other objets and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a camera grip according to the present invention with reference to the accompanying drawings.

Figure 1:
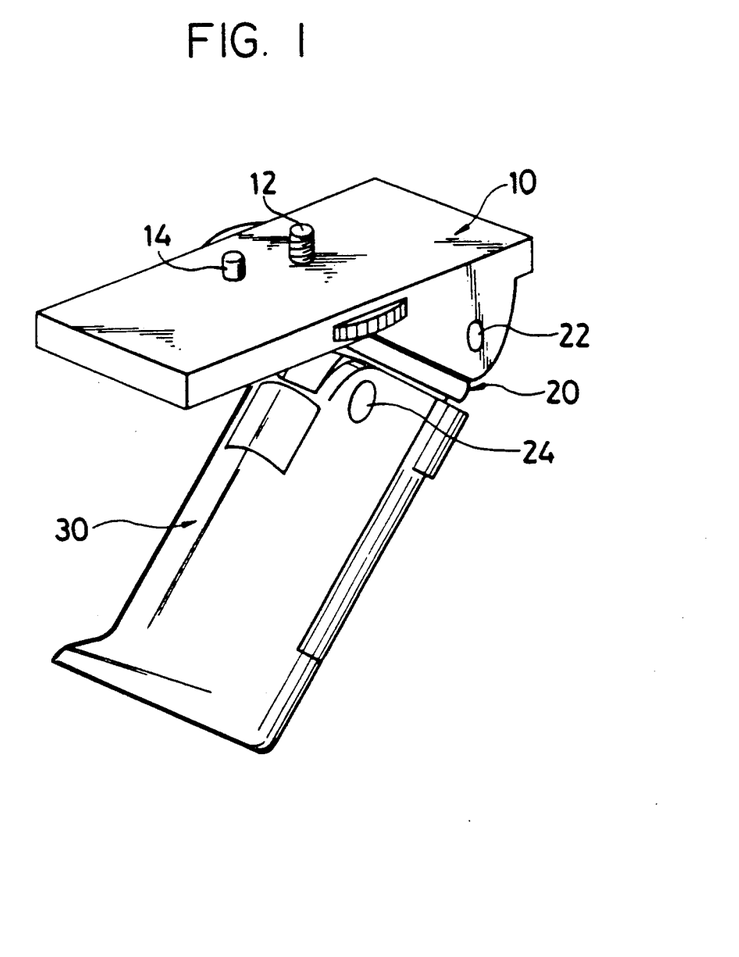
FIGS. 1 and 2 are respectively perspective views of a first embodiment of a camera grip according to the present invention.
Figure 2:
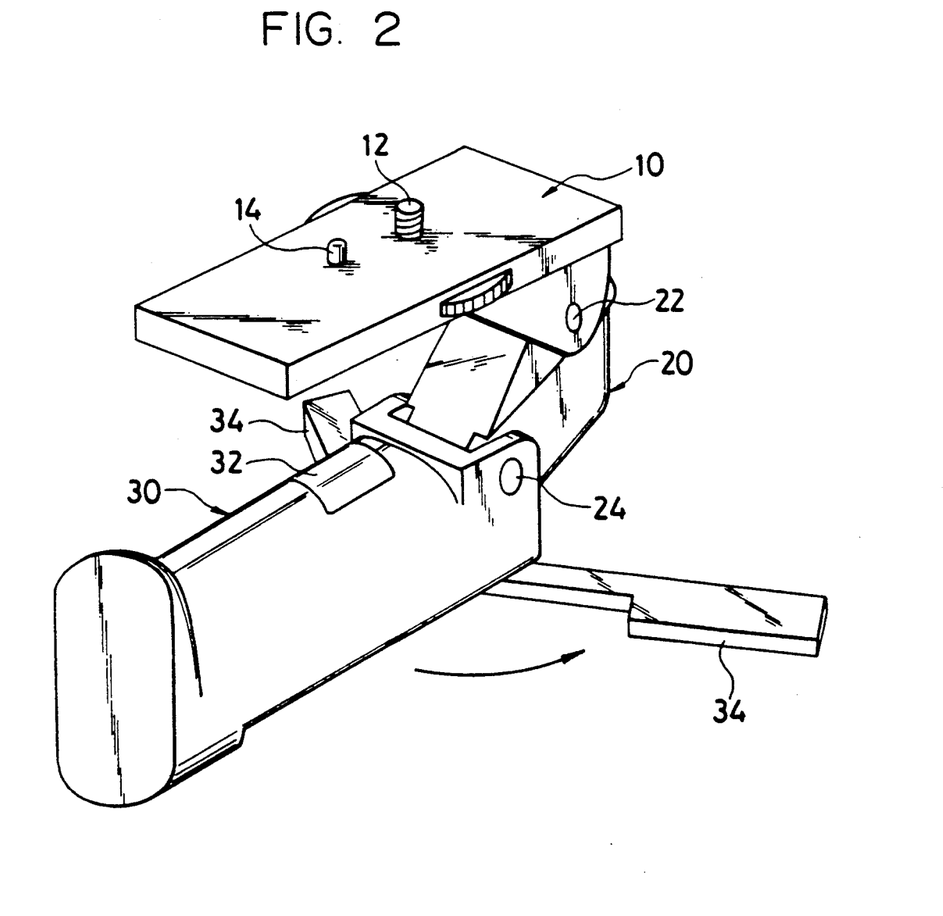

FIG. 1 shows a condition in which a camera grip according to the invention is being used as an under grip (which is hereinafter referred to as a grip condition), and FIG. 2 shows a condition in which the present camera grip is being used as a tripod (which is hereinafter referred to as a tripod condition).

As shown in FIGS. 1 and 2, the camera grip is mainly composed of a base block 10, an arm block 20 and a grip block 30.

The base block 10, which is mounted to the bottom portion of a camera by use of a tripod mount screw hole and a positioning recess respectively formed in the camera bottom portion, includes a mount screw 12 and a positioning pin 14.

The arm block 20 is mounted to the base block 10 by means of a first shaft 22 in such a manner that it can be freely rotated, while the grip block 30 is mounted to the arm block 20 by means of a second shaft 24 such that it is freely rotatable.

The grip block 30 is the part of the camera grip that is actually held by an operator's hand, and the grip block 30 includes a photographing button 32 of a trigger type which is used to instruct the start/stop of photographing, and a pair of legs 34, 34 for a tripod which, as shown by an arrow in FIG. 2, are rotatably disposed on the opposite sides of the grip block 30.

Next, description will be given below of a lock mechanism which is used to lock the rotational movements between the base block 10 and arm block 20 as well as between the arm block 20 and grip block 30.

Figure 3:
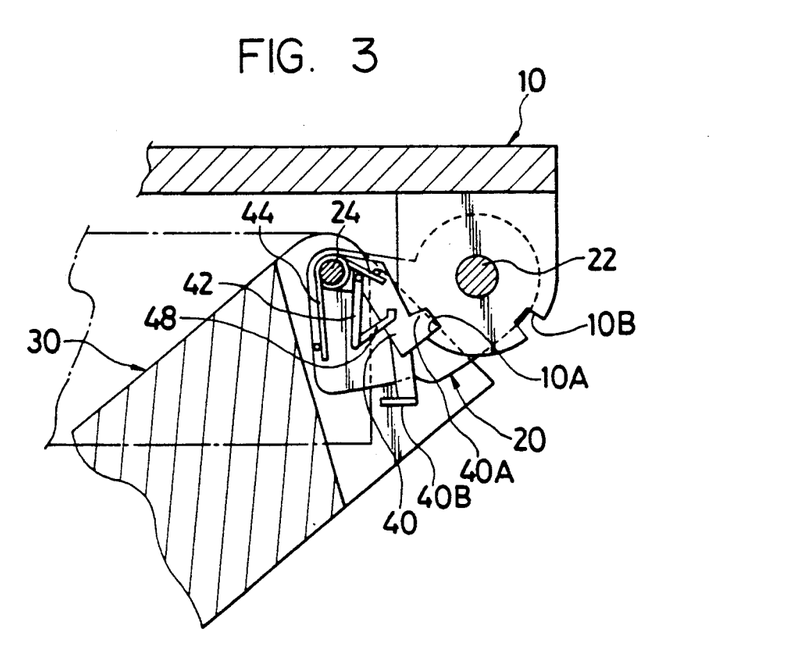
FIGS. 3 and 4 are respectively section views of main portions of the embodiment shown in FIGS. 1 and 2.
Figure 4:
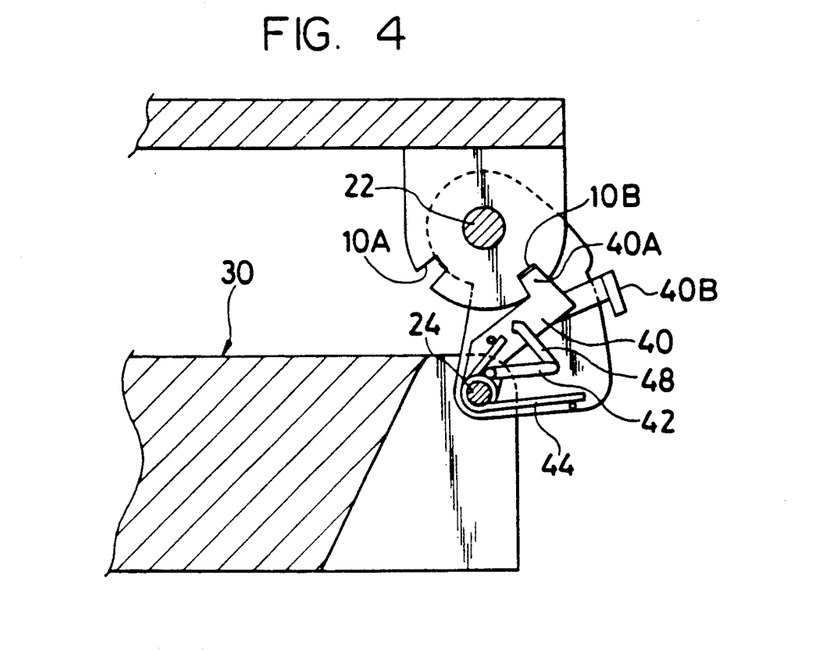
Figure 5:
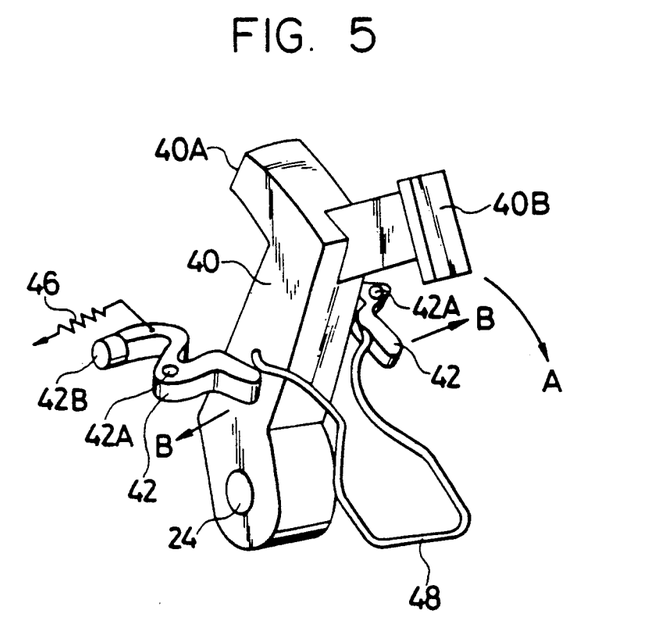
FIG. 5 is a perspective view of a lock means, illustrating a lock mechanism.

Here, FIGS. 3 and 4 are respectively sections views of main portions of the embodiment shown in FIGS. 1 and 2, and FIG. 5 is a perspective view of a lock member which is disposed within the arm block 20.

As shown in these figures, the lock mechanism includes a lock member 40, a pair of right and left lock claws 42, 42, springs 44, 46, 48, recesses 10A, 10B respectively formed in the base block 10, and lock holes respectively formed in the grip block 30 (which are not shown, but actually three lock holes are formed on every right and left sides of the grip block 30 and are disposed at the corresponding positions to the actual locking positions).

The lock member 40 is arranged in such a manner that it can be freely rotated by means of the second shaft 24 and also that it is energized by the spring 44 in a counter clockwise direction in FIGS. 3 and 4. The lock member 40 has a locking projection 40A which is normally fitted into either of the recess 10A or 10B of the base block 10 to thereby be able to achieve the locking. To remove the locking achieved by the lock member 40, the lock member 40 may be rotated in a clockwise direction against the energizing force of the spring 44 by use of a knob 40B provided in the lock member 40.

Also the lock claws 42, 42, as shown in FIG. 5, are rotatably mounted to the arm block 20 by means of support shafts 42A, 42A and are energized by the spring 46 in a direction in which claw portions 42B, 42B disposed in the ends thereof are projected out, so that the claw portions 42B, 42B can be fitted into the right and left lock holes in the grip block 30 to thereby achieve the locking.

To remove the locking achieved by the lock claws 42, 42, similarly to the above-mentioned removal of the locking by the lock member 40, the lock member 40 may be rotated clockwise against the energizing force of the spring 44. In other words, as shown in FIG. 5, if the lock member 40 is rotated in a lock removing direction (namely, in a direction of an arrow A), then the spring 48 is opened wide right and left in link with this rotational movement. Responsive to the wide opening of the spring 48, the lock claws 42, 42 are rotated about the support shafts 42A, 42A in a direction of an arrow B, thereby removing the locking.

Figure 6:
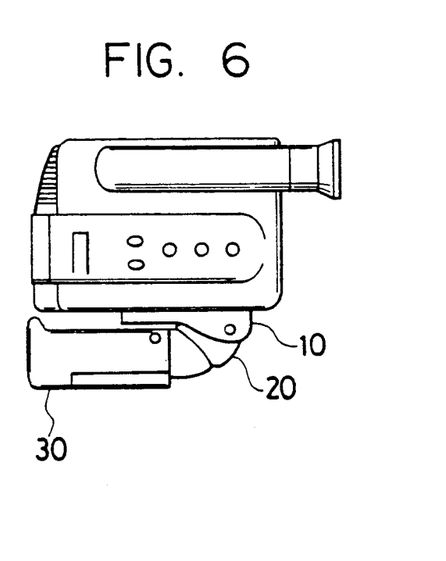
FIGS. 6 to 9 are views respectively illustrating the stored condition of a camera grip according to the invention, the condition thereof in which it is being used as a grip, the condition thereof in which it is being used a carrying handle, and the condition thereof in which it is being used as a tripod.

Now, as shown in FIG. 3, if the locking projection 40A of the lock member 40 is fitted into the recess 10A in the base block 10 and also the grip block 30 is rotated substantially in parallel to the base block 10 as shown by a one-dot chained line for locking, then a grip storage condition is attained (refer to FIG. 6).

Figure 7:
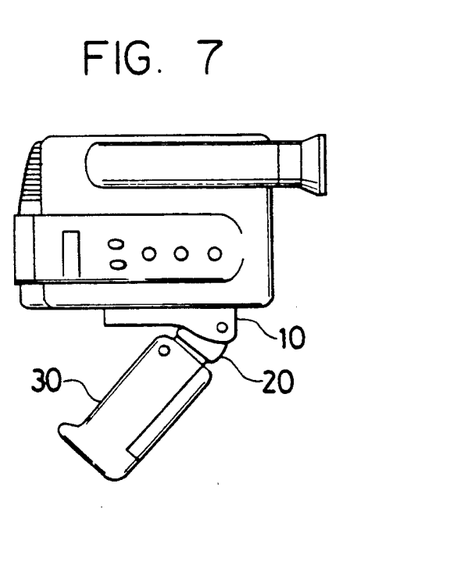

From the grip storage condition, if only the grip block 30 is rotated to a position shown by a solid line for locking, then the grip condition can be accomplished (refer to FIGS. 1 and 7).

Figure 8:
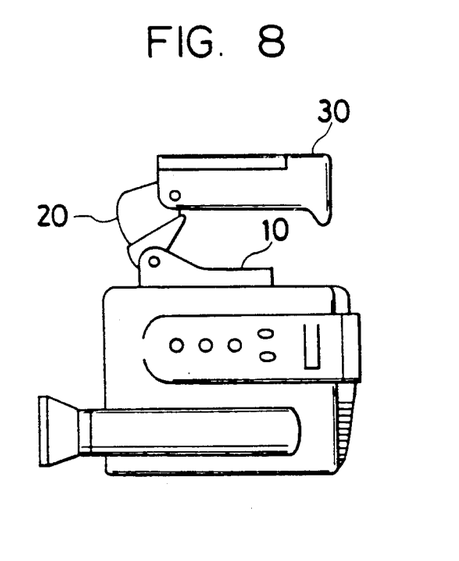

Next, as shown in FIG. 4, if the locking projection 40A of the lock member 40 is fitted into the recess 10B in the base block 10 and the grip block 30 is rotated substantially in parallel to the base block 10 for locking, then a carrying handle condition can be obtained (refer to FIG. 8).

Figure 9:
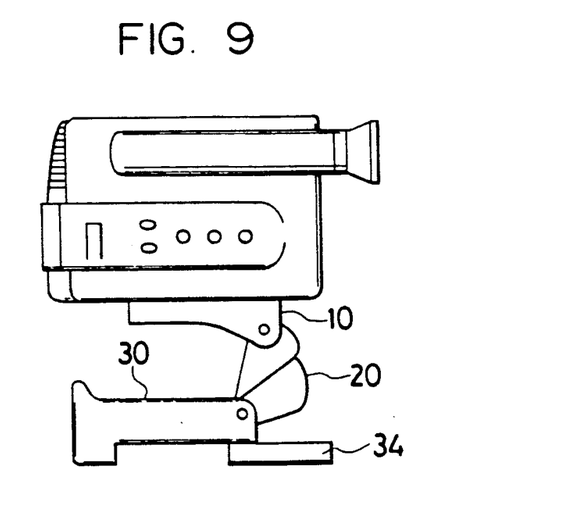

Further, from the above carrying handle condition, if the pair of right and left tripod legs 34, 34 are opened wide, then the tripod condition can be achieved (refer to FIGS. 2 and 9).

As has been described heretofore, according to the present camera grip of the invention, the present camera grip can be handled with ease and can be used as a carrying handle, and further, when not in use, it can be made compact or thin and thus can be stored in the bottom portion of the camera.

Referring now to FIGS. 10 to 13, there is shown a second embodiment of a camera grip according to the invention. In these figures, parts having the same functions as the conventional parts shown in FIGS. 16 to 19 are given the same designations and the description thereof is omitted here.

As shown in FIGS. 10 to 13, a grip 131 comprises a grip base part 132 to be fixed (o a video camera and a grip main body 113. A mount screw 136, which is used to fix the grip 131, is connected to an operation knob 133 through a gear mechanism.

Figure 10:
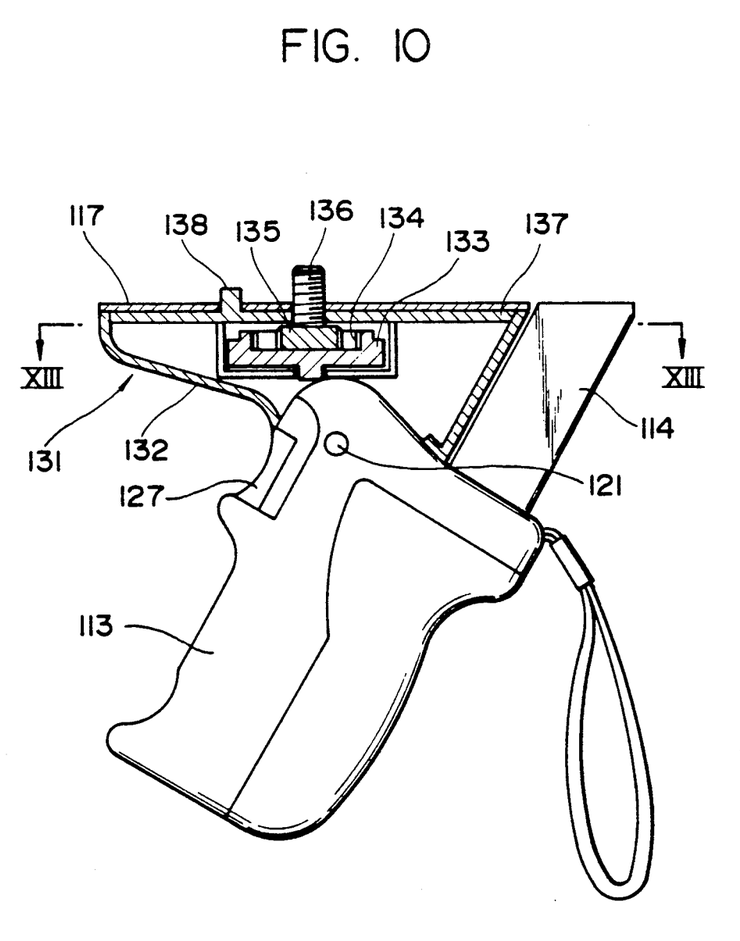
FIG. 10 is a partially cut-away front view of a second embodiment of a camera grip according to the invention.
Figure 11:
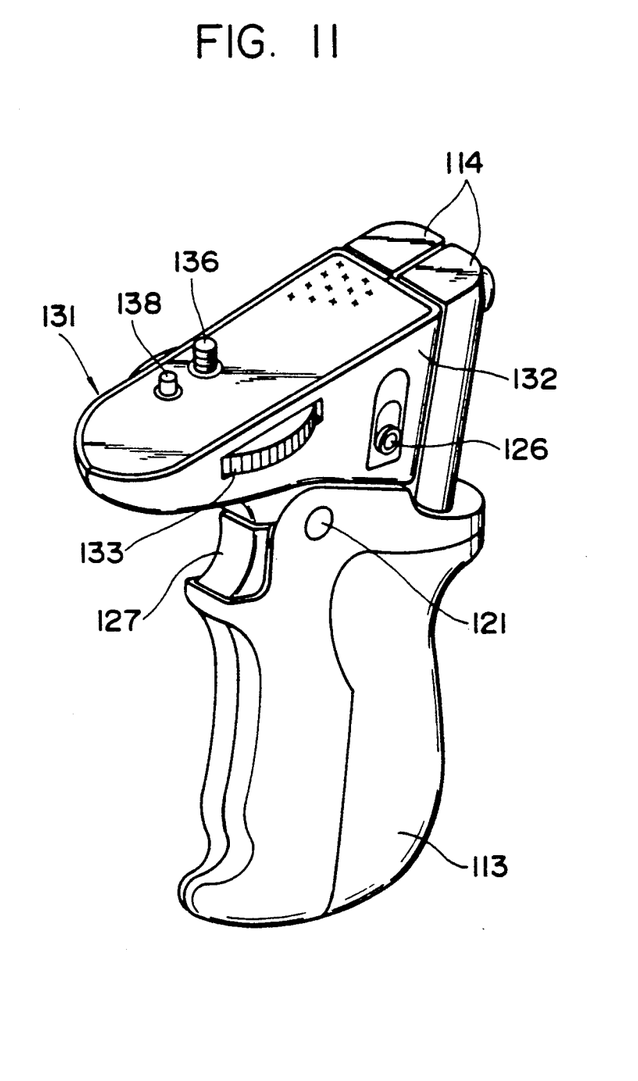
FIG. 11 is a perspective view of the above second embodiment.
Figure 12:
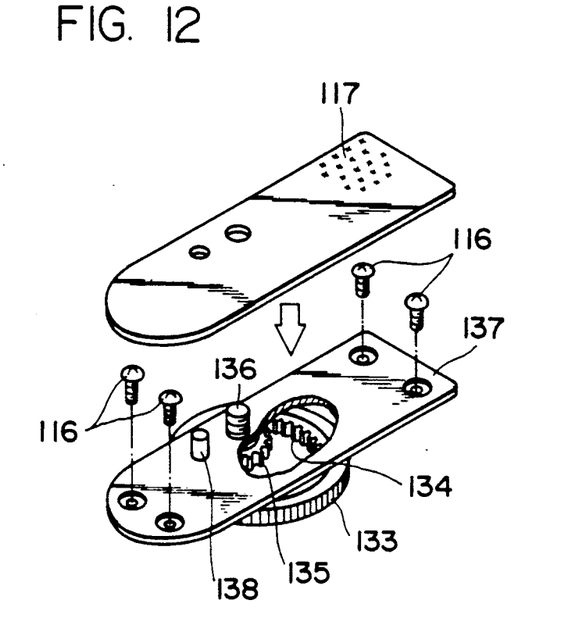
FIG. 12 is an exploded perspective view of a grip base part of a camera grip according to the invention.
Figure 13:
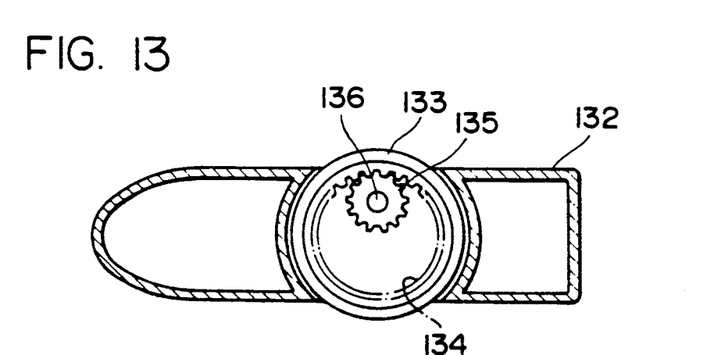
FIG. 13 is a section view taken along the line XIII—XIII in FIG. 10, illustrating a gear mechanism.

The grip base part 132 supports a disc-like operation knob 133 in the upper portion thereof in such a manner that the operation knob 133 can be rotated freely. The operation knob 133 includes an internal gear 134 in the inner periphery thereof. And, an external gear 135 is disposed inside the operation knob 133 and meshes with the internal gear 134. The external gear 135 includes in the upper portion thereof a mount screw 136 formed integrally therewith, and the leading end portion of the mount screw 136 extends through a base plate 137 fixed to the upper portion of the grip base part 132 and projects out upwardly.

The position of the mount screw 136 is set so as to match a screw hole (not shown) formed in a video camera. When the position of the screw hole is altered, the external gear 135 having the mount screw 136 may be moved within a range in which the external gear 135 meshes with the internal gear 134 to match the altered screw hole, that is, the base plate 137 need only to be replaced.

The base plate 137 includes in the upper surface thereof a positioning projection 138 formed integrally therewith.

Now, to mount the grip 131 to the video camera, the positioning projection 138 of the grip 131 may be fitted into a positioning hole formed in the video camera and the mount screw 136 may be inserted into the above-mentioned screw hole in the video camera, and after then the operation knob 133 may be rotated to thereby bring the grip 131 and video camera into threaded engagement with each other, so that the grip 131 can be fixed to the video camera. During this operation, if the operation knob 133 is rotated, then the internal gear 134 is rotated integrally with the knob 133 and thus the external gear 135 meshing with the internal gear 134 is caused to rotate at that position, which in turn causes the mount screw 136 to rotate and thus to engage threadedly with the screw hole in the video camera.

As described above, according to the illustrated embodiment of the invention, even if the screw hole of the video camera is not positioned at the center of gravity of the video camera, because the mount screw 136 is disposed so as to correspond to the position of the screw hole by means of the external gear 135, the grip 131 can be easily mounted to a predetermined position of the video camera.

Figure 14:
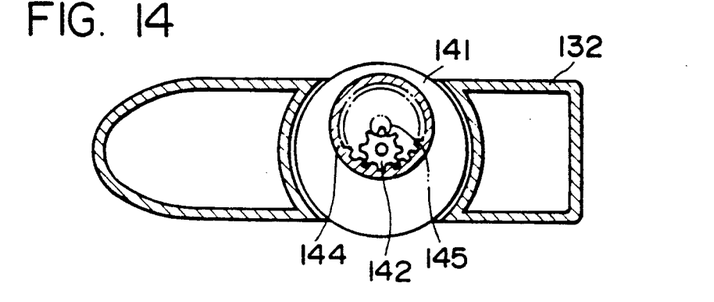
FIG. 14 is a section view of another gear mechanism.

In the above-mentioned embodiment, the internal gear 134 is formed in the operation knob 133 and the mount screw 136 is formed in the external gear 135 which meshes with the internal gear 134. However, as shown in FIG. 14, an external gear 142 is formed integrally with an operation knob 141 at the central position thereof, an internal gear 144 may be formed so as to be able to mesh with the external gear 142, and a mount screw 145 may be formed in the internal gear 144.

In this case, to mount the grip 131 to the video camera, the mount screw 145 is inserted into a screw hole formed in the video camera, the operation knob 141 is rotated to thereby rotate the external gear 142 integrally therewith. As a result of this, the internal gear 144 meshing with the external gear 142 is rotated at that position to thereby rotate the mount screw 145, so that the mount screw 145 can be threadedly engaged with the screw hole in the video camera. That is, the grip 131 can be fixed to the video camera.

Figure 15:
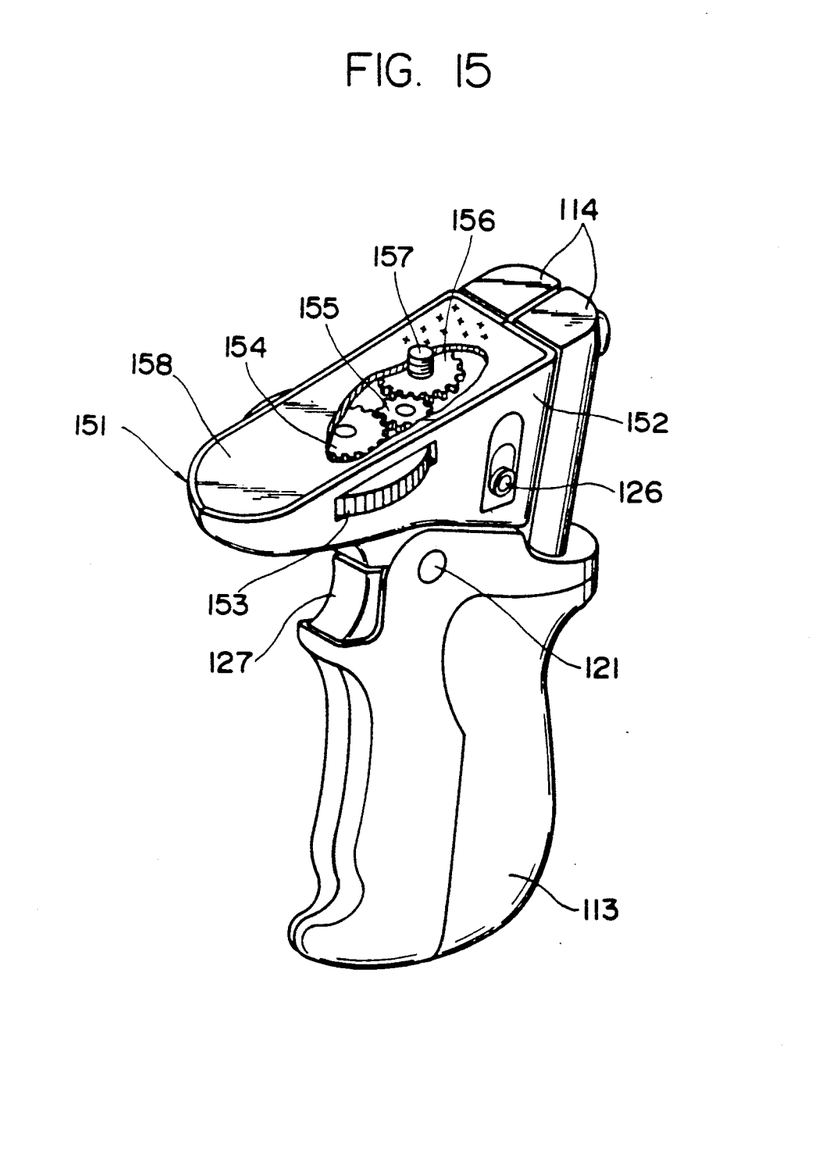
FIG. 15 is a partially cut-away front view of a third embodiment of a camera grip according to the invention.

Referring now to FIG. 15, there is shown a third embodiment of a camera grip according to the invention. Here again, parts having the same functions as those illustrated in the previous embodiments of the invention are given the same designations and the description thereof is omitted here.

As shown in FIG. 15, in the present embodiment, a grip 151 includes a grip base part 152 and, in the upper portion of the grip base part 152, a disc-like operation knob 153 is rotatably supported. The operation knob 153 includes an external gear 154 formed integrally therewith. The external gear 154 is arranged to mesh with an idle gear 155, which in turn meshes with an external gear 156. The external gear 156 includes on the top portion thereof a mount screw 157 formed integrally therewith. The mount screw 157 has a leading end portion which extends through a base plate 158 fixed on the top portion of the grip base part 152 and projects out upwardly from the base plate 158.

In the present embodiment, to mount the grip 151 to a video camera, the mount screw 157 is inserted into a screw hole formed in the video camera and the operation knob 153 is then rotated to thereby rotate the external gear 154 integrally With the operation knob 153. The rotation of the external gear 154 causes the mount screw 157 to rotate by means of the idle gear 155, so that the mount screw 157 can be threadedly engaged With the screw hole in the video camera. In this manner, the grip 151 can be fixed to the video camera.

Figure 16:
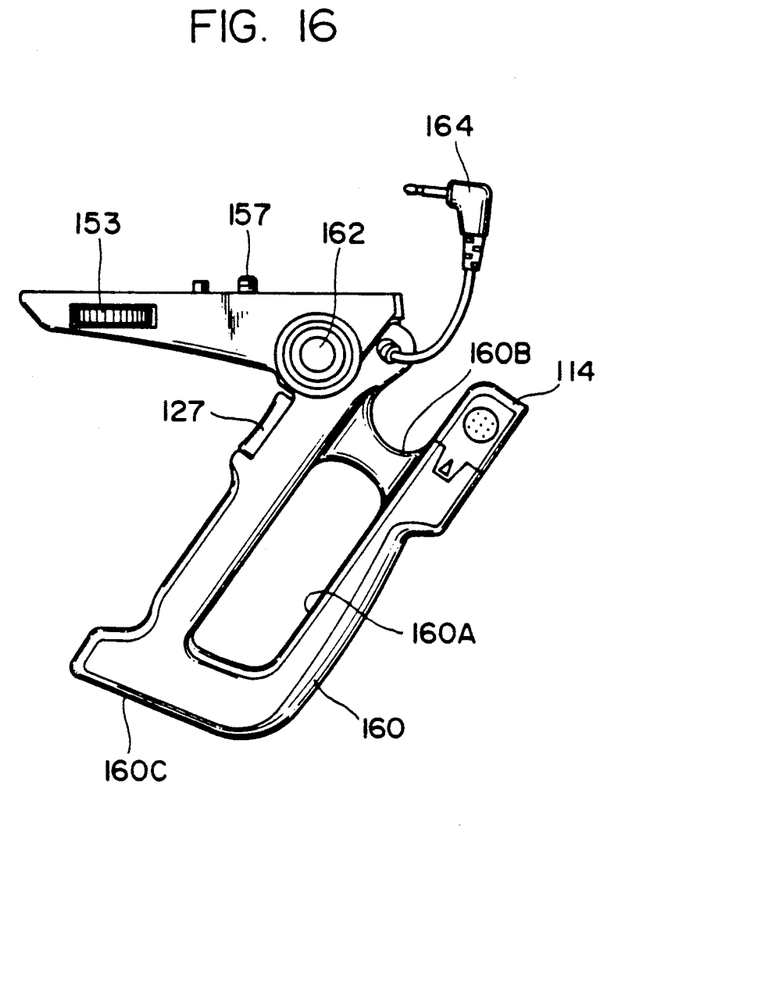
FIG. 16 is a front view of a modification of another embodiment of the camera grip shown in FIG. 15.

Referring now to FIG. 16, there is shown a front view of a modification of another embodiment of the camera grip shown in FIG. 15. In this figure, parts having the same functions as those employed in the grip shown in FIG. 15 are given the same designations and the description thereof is omitted here.

In FIG. 16, the rotational force of the operation knob 153 is transmitted to the mount screw by means of an idle gear, similarly in the grip shown in FIG. 15.

A grip main body 160 shown in FIG. 16 is different from that shown in FIG. 15, in that it includes in the center portion thereof an opening 160A in which operator's middle, medical and little fingers can be inserted and also includes in upper portion thereof a recess 160B on which operator's forefinger can be put hookingly.

In other words, the grip main body 160 can be used as a carrying handle. When it is used as a carrying handle, a lock removing button 162 can be used to determine the angle of the grip main body 160 so that the grip main body 160 is parallel to the camera main body. Then, by inserting the middle, medical and little fingers into the opening 160A in the grip main body 160 and also by hookingly putting the forefinger on the recess 160B, the operator can hang and carry the camera.

In FIG. 16, reference numeral 164 designates a connecting cord which is to be connected to a remote-control terminal provided in the camera main body. Also, in the bottom portion 160C of the grip main body 160, there are incorporated a remote-control light receiving part and a display lamp. Due to this, especially when the grip is used as a tripod, the camera main body can be remotely controlled by means of the thus constructed grip.

It should be noted here that the gap mechanism is not limited to that employed in the present embodiment, but other gear mechanisms can also be used. Also, in the respective embodiments of the invention, by changing the gear ratio, the present camera grip can be easily fixed to the camera with a small force and can be easily operated.

As has been described in detail heretofore by way of the preferred embodiments, according to the camera grip of the invention, due to the fact that there is provided a mount screw which projects out upwardly and threadedly engages with the lower portion of a camera, there is provided an operation knob which is used to rotate the mount screw, and the mount screw and operation knob are connected with each other by means of a great mechanism, even if the position of a screw hole to be formed in the camera is altered, the mount screw can be set easily at such a position to correspond to the altered position of the screw hole so that the grip can be mounted for sure to a predetermined position in the camera.

Also, the present grip can be obtained simply by changing only the upper portion of a conventionally used grip and thus the costs of the grip need not be increased, that is, the present grip can be supplied at low costs.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera grip comprising:
   a base block removably disposed in the bottom portion of a camera;
   an arm block rotatably mounted to said base block by means of a first shaft;
   a grip block means for holding said camera, said grip block means including a grip block which is rotatably mounted to said arm block by means of a second shaft spaced apart from said first shaft; and
   lock means for locking said arm and grip blocks at predetermined positions of rotation, respectively.

2. A camera grip as set forth in claim 1, wherein said lock means comprises:
   first lock means for locking said base and arm blocks respectively at their rotational position for using said grip block as a grip or storing said grip block in said camera bottom portion and at their rotational position for using said grip block as a carrying handle or as tripod; and,
   second lock means for locking said arm and grip blocks respectively at their rotational position for storing said grip block in said camera bottom portion, at their rotational position for using said grip block as a grip, and at their rotational position for using said grip block as a carrying handle or as a tripod.

3. A camera grip as set forth in claim 1 or 2, wherein said grip block includes a pair of right and left tripod legs which can be rotated freely.

4. In a camera grip which is disposed removably in the bottom portion of a camera, the improvement comprising:
- a mount screw projecting out upwardly and threadedly engageable with said camera bottom portion; and,
- an operation knob for rotating said mount screw;
- said mount screw and operation knob being connected with each other by means of a gear mechanism.

5. A camera grip as set forth in claim 4, wherein said gear mechanism comprises a first gear fixed coaxially with the shaft of rotation of said mount screw and a second gear fixed coaxially with the shaft of rotation of said operation knob and meshable with said first gear.

6. A camera grip as set forth in claim 5, wherein said first gear is an external gear having outwardly extending teeth and said second gear is an internal gear having inwardly extending teeth.

7. A camera grip as set forth in claim 5, wherein said first gear is an internal gear having inwardly extending teeth and said second gear is an external gear having outwardly extending teeth.

8. A camera grip as set forth in claim 4, wherein said gear mechanism comprises a first external gear fixed coaxially with the shaft of rotation of said mount screw, a second external gear fixed coaxially with the shaft of rotation of said operation knob, and an idle gear meshable with said first and second external gears respectively, said first and second external gears having teeth extending outwardly therefrom.

* * * * *